(12) United States Patent
Iatan et al.

(10) Patent No.: US 9,676,155 B2
(45) Date of Patent: Jun. 13, 2017

(54) INJECTION-MOLDED THICK LENS

(71) Applicant: DBM REFLEX ENTERPRISES INC., Laval (CA)

(72) Inventors: George Iatan, Saint-Lambert (CA); Michel Marcotte, Joliette (CA)

(73) Assignee: DBM REFLEX ENTERPRISES INC., Laval, Quebec (CA)

( * ) Notice: Subject to any disclaimer, the term of this patent is extended or adjusted under 35 U.S.C. 154(b) by 23 days.

(21) Appl. No.: 15/016,815

(22) Filed: Feb. 5, 2016

(65) Prior Publication Data

US 2016/0153640 A1   Jun. 2, 2016

Related U.S. Application Data

(63) Continuation of application No. PCT/CA2014/050735, filed on Aug. 5, 2014.
(Continued)

(51) Int. Cl.
*B29D 11/00* (2006.01)
*B29C 45/16* (2006.01)
(Continued)

(52) U.S. Cl.
CPC ...... *B29D 11/0073* (2013.01); *B29C 45/0003* (2013.01); *B29C 45/1635* (2013.01);
(Continued)

(58) Field of Classification Search
CPC .......... B29D 11/0073; B29D 11/00009; B29D 11/0048; F21K 9/60; B29C 45/0003;
(Continued)

(56) References Cited

U.S. PATENT DOCUMENTS

| 4,734,023 A | 3/1988 | Nesch et al. |
| 4,935,184 A | 6/1990 | Sorensen |

(Continued)

FOREIGN PATENT DOCUMENTS

| AT | 505321 B1 | 7/2010 |
| DE | 298620 A5 | 3/1992 |

(Continued)

OTHER PUBLICATIONS

Written opinion from ISA/CA dated Oct. 23, 2014 for PCT/CA2014/050734.
(Continued)

*Primary Examiner* — Mary Ellen Bowman
(74) *Attorney, Agent, or Firm* — IPAXIO S.E.N.C.

(57) ABSTRACT

The lens is made by injection molding in a mold through the injection of molten plastic material in at least three injection shots using a multistep process. It includes a first outer lens part, a second outer lens part and a lens core part forming an interior of the lens. The lens core part is embedded between the first and second outer lens parts. The lens core part is divided into at least two subparts separated at least partially by at least one elongated slot extending across the lens core part between the first and second surfaces of the lens core part. The slot or slots made through the lens core part are filled and fused with the plastic material of the first outer lens part.

16 Claims, 16 Drawing Sheets

Related U.S. Application Data

(60) Provisional application No. 61/899,006, filed on Nov. 1, 2013, provisional application No. 61/862,366, filed on Aug. 5, 2013.

(51) Int. Cl.

| | | |
|---|---|---|
| *G02B 19/00* | (2006.01) | |
| *B29C 45/00* | (2006.01) | |
| *B29C 45/72* | (2006.01) | |
| *F21V 5/04* | (2006.01) | |
| *F21V 7/00* | (2006.01) | |
| *F21V 13/04* | (2006.01) | |
| *F21K 9/60* | (2016.01) | |
| *B29L 11/00* | (2006.01) | |
| *B29K 33/00* | (2006.01) | |
| *B29K 69/00* | (2006.01) | |

(52) U.S. Cl.
CPC ...... *B29C 45/1642* (2013.01); *B29C 45/7207* (2013.01); *B29D 11/00009* (2013.01); *B29D 11/0048* (2013.01); *F21K 9/60* (2016.08); *F21V 5/048* (2013.01); *F21V 7/0091* (2013.01); *F21V 13/04* (2013.01); *G02B 19/0014* (2013.01); *G02B 19/0028* (2013.01); *G02B 19/0061* (2013.01); *B29C 2045/1637* (2013.01); *B29K 2033/12* (2013.01); *B29K 2069/00* (2013.01); *B29K 2995/003* (2013.01); *B29K 2995/0026* (2013.01); *B29L 2011/0016* (2013.01)

(58) Field of Classification Search
CPC ............ B29C 45/1635; B29C 45/1642; B29C 45/7207; F21V 5/048; F21V 7/0091; F21V 13/04; G02B 19/0014; G02B 19/0028; G02B 19/0061
See application file for complete search history.

(56) References Cited

U.S. PATENT DOCUMENTS

| | | | |
|---|---|---|---|
| 5,045,268 A | 9/1991 | Sorensen | |
| 5,413,743 A | 5/1995 | Prophet | |
| 5,922,250 A | 7/1999 | Ishikawa et al. | |
| 6,139,305 A | 10/2000 | Nesch | |
| 6,238,600 B1* | 5/2001 | Kuo | B29D 11/00009 |
| | | | 264/1.7 |
| 6,416,690 B1 | 7/2002 | Soane et al. | |
| 7,150,845 B1 | 12/2006 | Gram | |
| 7,314,362 B2 | 1/2008 | Lichtinger | |
| 7,455,516 B2 | 11/2008 | Glashagen et al. | |
| 7,833,008 B2 | 11/2010 | Wimberger | |
| 7,871,260 B2 | 1/2011 | Boucherie | |
| 7,965,445 B2 | 6/2011 | Chen et al. | |
| 8,182,262 B2 | 5/2012 | Steinebrunner et al. | |
| 8,360,764 B2 | 1/2013 | Armbruster et al. | |
| 8,740,607 B2 | 6/2014 | Pfeifer et al. | |
| 8,891,171 B2 | 11/2014 | Choquet et al. | |
| 2004/0195722 A1 | 10/2004 | Yang | |
| 2006/0220268 A1* | 10/2006 | Chao | B29C 45/2673 |
| | | | 264/2.5 |
| 2007/0194494 A1 | 8/2007 | Hartlmeier | |
| 2008/0299340 A1 | 12/2008 | Kamienski et al. | |
| 2009/0291206 A1 | 11/2009 | Jiang | |
| 2012/0049408 A1 | 3/2012 | Okamoto | |
| 2012/0250331 A1 | 10/2012 | De Lamberteire | |
| 2013/0265776 A1 | 10/2013 | Zoellner et al. | |
| 2013/0278892 A1 | 10/2013 | Jiang et al. | |
| 2014/0332991 A1 | 11/2014 | Giessauf et al. | |

FOREIGN PATENT DOCUMENTS

| | | |
|---|---|---|
| DE | 10121691 A1 | 11/2002 |
| DE | 102004058973 B4 | 10/2007 |
| DE | 102007011338 A1 | 9/2008 |
| DE | 102007020418 A1 | 10/2008 |
| DE | 102008034153 A1 | 1/2010 |
| EP | 671251 A1 | 9/1995 |
| EP | 2402140 A1 | 1/2012 |
| EP | 1782936 B2 | 2/2013 |
| EP | 2578376 A1 | 4/2013 |
| JP | 2001191365 A | 7/2001 |
| WO | 9423929 A1 | 10/1994 |
| WO | 2010064214 A1 | 6/2010 |
| WO | 2011061638 A1 | 5/2011 |
| WO | 2011083002 A1 | 7/2011 |
| WO | 2012157827 A1 | 11/2012 |
| WO | 2015017929 A1 | 2/2015 |
| WO | 2015017930 A1 | 2/2015 |

OTHER PUBLICATIONS

Written opinion from ISA/CA dated Oct. 20, 2014 for PCT/CA2014/050735.
Stricher, Michael et al., Focus on Precision, Kunststoffe international, Apr. 2009.
Machine translation in English of AT-505 321 B1.
Machine translation in English of DE 101 21 691 A1.
Machine translation in English of DE 10 2004 058 973 B4.
Machine translation in English of DE 10 2007 011 338 A1.
Machine translation in English of DE 10 2007 020 418 A1.
Machine translation in English of DE 10 2008 034 153 A1.
Machine translation in English of EP 0 671 251 A1.
Machine translation in English of EP 1 782 936 B2.
Machine translation in English of EP 2 402 140 A1.
Machine translation in English of EP 2 578 376 A1.
Machine translation in English of JP 2001191365 A.
Machine translation in English of WO 2011/083002 A1.
Machine translation in English of WO 2012/157827 A1.

* cited by examiner

INJECTION-MOLDED THICK LENS

CROSS REFERENCE TO PRIOR APPLICATIONS

The present case is a continuation of PCT patent application No. PCT/CA2014/050735 filed on 5 Aug. 2014. PCT patent application No. PCT/CA2014/050735 claims the benefits of U.S. patent applications Nos. 61/862,366 filed on 5 Aug. 2013 and 61/899,006 filed on 1 Nov. 2013. The contents of all these prior applications are hereby incorporated by reference in their entirety.

TECHNICAL FIELD

The technical field relates generally to lenses made by injection molding.

BACKGROUND

Illumination apparatuses for automotive vehicles often use powerful incandescent light sources that generate an intense heat. These light sources are generally optically coupled to optical glass lenses since glass can withstand the generated heat and will not deform in use. However, the heat from most incandescent light sources is generally too high for optical lenses made of plastic materials.

Solid state light sources generate considerably less heat than incandescent light sources having the same illumination power. White LEDs are increasingly used as light sources in illumination apparatuses for the automotive industry, for example in head lights. Such illumination apparatuses can thus include optical lenses made of plastic materials because heat is not as high as with incandescent light sources.

Illumination apparatuses for automotive vehicles generally use thick lenses to project the light in front of the vehicles. The light beam from the light sources is projected as a magnified image and the lens refracts the light beams accordingly. Thick lenses have a relatively high ratio between the thickness of the lens along the central optical axis and the thickness of the lens at the edges. These optical lenses are thus relatively thicker compare to optical lenses in other applications, as defined by the standard understanding in the industry in terms of the ratio between the key dimensions of optical lenses.

Thick lenses made of plastic materials are not easy to manufacture using usual injection molding methods because the injection molding process itself may cause deformations of the optical active surfaces. For instance, these lenses tend to shrink during cooling in a manner that reduces their accuracy and performances. Ultimately, the quality of thick lenses made of plastic materials can become an issue, particularly when high production volumes are required. One example of such context is the automotive and lighting industries. Using the known injection methods thus create challenges in terms of costs and complexities. Other injection molding issues can have a negative impact on the quality of thick lenses, particularly in terms of having a stable batch-to-batch consistency and surface accuracy.

Multistep injection methods for manufacturing plastic lenses have been used for several years. For instance, such method can include using rotary molds or shuttle molds to inject two or more layers of the same plastic material over one another with a clear boundary surface between each layer. However, several applications require stringent tolerances of the shape and the curvatures of optical lenses that can be difficult to obtain using these known methods, particularly for manufacturing thick lenses.

Clearly, room for improvements always exists in this area of technology.

SUMMARY

There is provided herein a thick lens for use with a light source, the lens being made by injection molding in a mold through the injection of a molten plastic material in at least three injection shots using a multistep process, the lens including: a first outer lens part having opposite first and second surfaces, the first surface of the first outer lens part defining a first optical active surface of the lens that refracts incoming light beams from the light source; a second outer lens part having opposite first and second surfaces, the first surface of the second outer lens part defining a second optical active surface of the lens that refracts the incoming light beams from the light source; and a lens core part forming an interior of the lens and that is embedded between the first outer lens part and the second outer lens part, the lens core part having opposite first and second surfaces, the lens core part being divided into at least two subparts separated at least partially by at least one elongated slot extending across the lens core part between the first and second surfaces of the lens core part; wherein the second surface of the first outer lens part and the first surface of the lens core part are fused together, the second surface of the second outer lens part and the second surface of the lens core part are fused together, and the at least one slot made through the lens core part is filled and fused with the plastic material of the first outer lens part, the lens having a lens body that is entirely filled with the plastic material in a gapless manner to prevent refraction inside the lens body of light beams from the light source.

There is also provided an illumination apparatus including: a solid state light source; and a thick lens through which light from the solid state light source is collected, the lens being constructed as previously defined.

Details on various aspects and features of the proposed concept will be apparent from the following detailed description and the appended figures.

DETAILED DESCRIPTION

Figure 1:
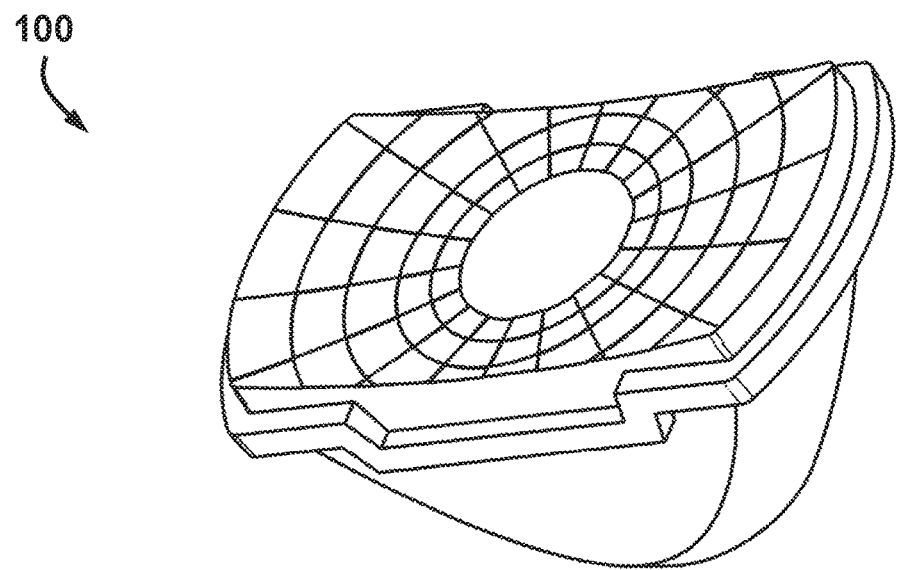
FIG. 1 is an isometric view illustrating an example of a generic thick lens as suggested herein.

FIG. 1 is an isometric view illustrating an example of a generic thick lens 100. The illustrated lens 100 is only for the sake of illustration. Numerous other shapes and configurations are possible as well.

The composite lens 100 is made of a same transparent plastic resin material. Examples of plastic materials include polymethylmethacrylate (PMMA) and polycarbonate, to name just a few. Other plastic materials can be used, depending on the implementation.

Figure 2:
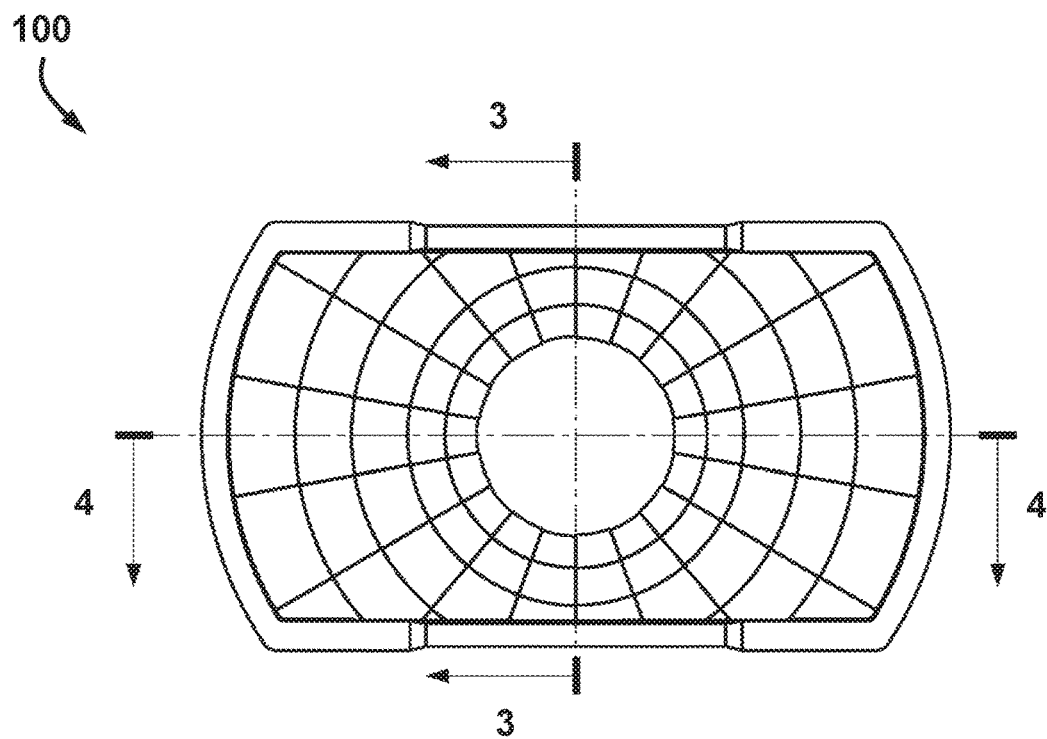
FIG. 2 is a front view of the lens of FIG. 1.
Figure 3:
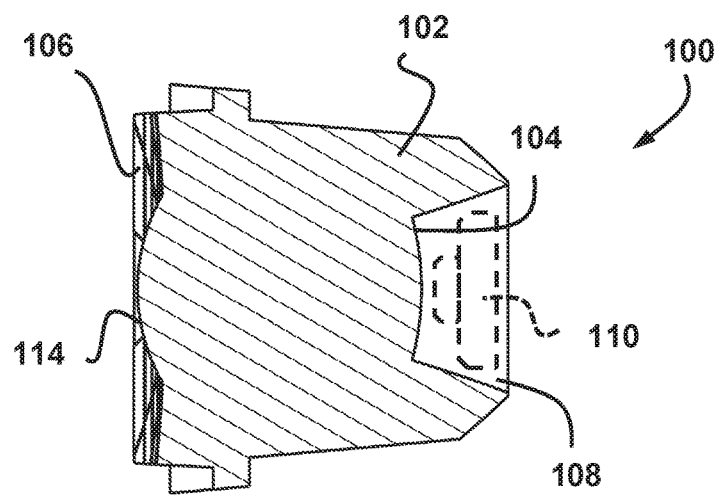
FIG. 3 is a cross-section view of the lens taken along line 3-3 in FIG. 2.
Figure 4:
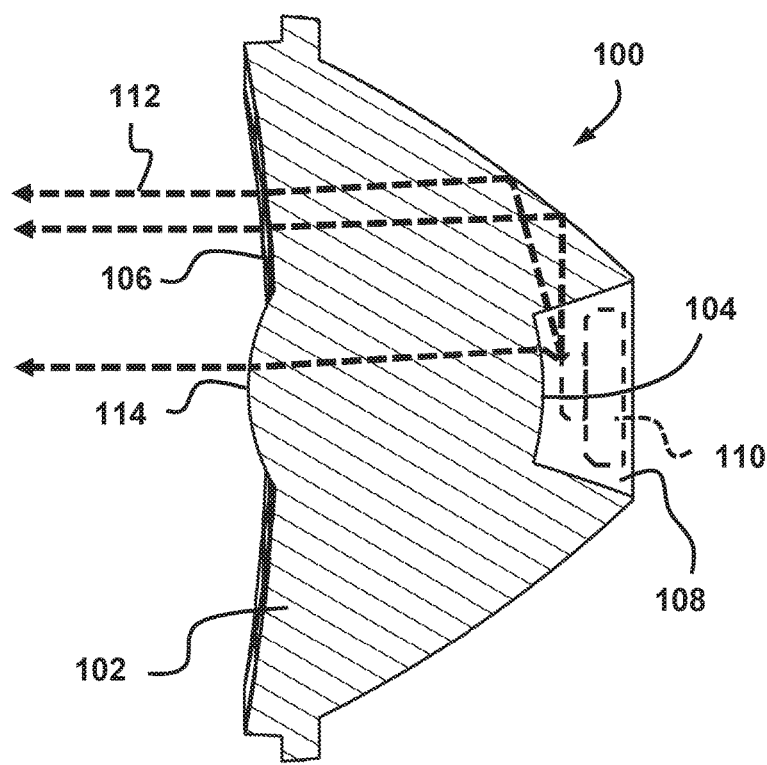
FIG. 4 is a cross-section view of the lens taken along line 4-4 in FIG. 2.

FIG. 2 is a front view of the lens 100 of FIG. 1. FIG. 3 is a cross-section view of the lens 100 taken along line 3-3 in FIG. 2. FIG. 4 is a cross-section view of the lens 100 taken along line 4-4 in FIG. 2.

As can be seen, the lens 100 includes a lens body 102 having a first optical active surface 104 on its rear side and a second optical active surface 106 on its front side. The first optical active surface 104 also includes at least one curved surface. The curved surface portion can be for instance spherical, cylindrical, aspheric, parabolic or free form. Variants are also possible.

The first optical active surface 104 of the illustrated example includes a recessed portion 108 into the lens body 102. The recessed portion 108 can be the location for a light source, for instance a solid state light source having one or more light emitting diodes (LED). Variants are possible as well. A solid state light source is schematically depicted in FIGS. 3 and 4 at 110. This can be an arrangement for an automotive headlamp. Other uses and applications are possible as well, including the ones outside the context of automotive vehicles such a general lighting, solar concentrators, etc.

In use, the solid state light source 110 is optically coupled to the lens 100. Light beams emitted by the solid state light source 110 enter the lens body 102 through the first optical active surface 104 and then exit through the second optical active surface 106. A generic example of a set of light beams 112 is shown in FIG. 4.

The second optical active surface 106 of the illustrated example includes a plurality of light diffusing elements to spread and orient the outgoing light in accordance with the requirements. They are shown as being concentrically disposed around a protruding curved portion 114 located at the center of the second optical active surface 106. The area around the protruding curved portion 114 is also shown as being concave. However, the exact shape, configuration and arrangement of all the optical active surfaces 104, 106 of the lens 100 can vary from one implementation to another. The illustrated lens 100 is generic and for this reason, the light diffusing elements on the second optical active surface 106 are only illustrated in a semi-schematic manner. They can also be omitted in some implementations.

As can be seen in FIG. 4, at least some of the light beams inside the lens 100 are reflected through total internal reflection (TIR) on internal TIR surfaces located on what constitutes the lateral sides of the lens 100. Some of the light beams also go through the lens body 102 without reflecting on the TIR surfaces.

Figure 5:
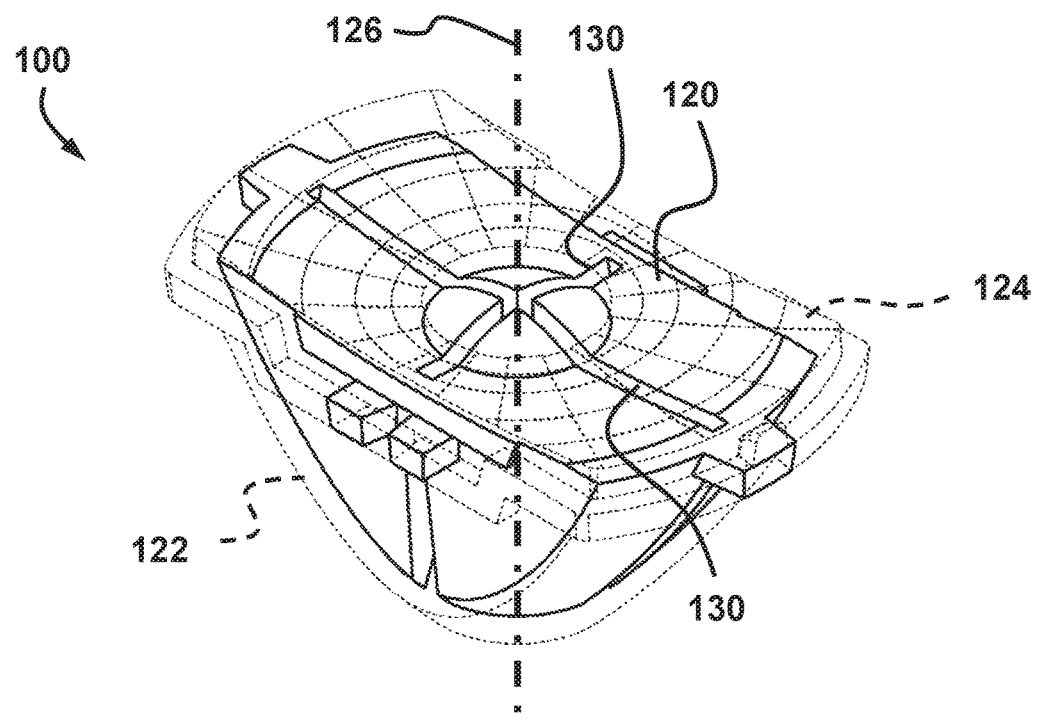
FIG. 5 is a semi-schematic isometric view of the lens of FIG. 1.

FIG. 5 is a semi-schematic isometric view of the lens 100 of FIG. 1. FIG. 5 shows that the lens 100 includes a core part 120 embedded between a first outer lens part 122 and a second outer lens part 124. The core part 120 is shown in solid lines while the two outer lens parts 122, 124 are shown in stippled lines. The first optical active surface 104 is located on the first outer lens part 122 and the second optical active surface 106 is located on the second outer lens part 124.

It should be noted that the core part 120 and the two outer lens parts 122, 124 are separately visible in FIG. 5 only for the sake of illustration.

The core part 120 and the two outer lens parts 122, 124 are fused together during manufacturing so as to create the resulting lens 100. The term "fused" means securing or bonding the lens layers together using heat coming from the hot molten plastic material during the manufacturing process to form a monolithic piece. The fused lens layers are generally made of the same plastic material but variants could be possible. The two outer lens parts 122, 124 have the same refractive index. The boundary between each of the outer lens parts 122, 124 and the core part 120 is not distinguishable or visible with naked eye, for example using the light coming from the solid state light source 110 (FIG. 4) with which the lens 100 will be used. The lens body 102 (FIGS. 3 and 4) is thus transparent to this light. There is thus no refraction of the light beams at the boundaries between the outer lens parts 122, 124 inside the lens 100. However, the boundaries could be viewed using polarized light, phase contrast microscopy or other known visualization devices or instruments.

As can also be seen in FIG. 5, the illustrated lens 100 has a central axis 126 passing through the first and second optical active surfaces. This lens 100 has a plane of symmetry that is coincident with the central axis 126. Variants are possible as well.

Figure 6:
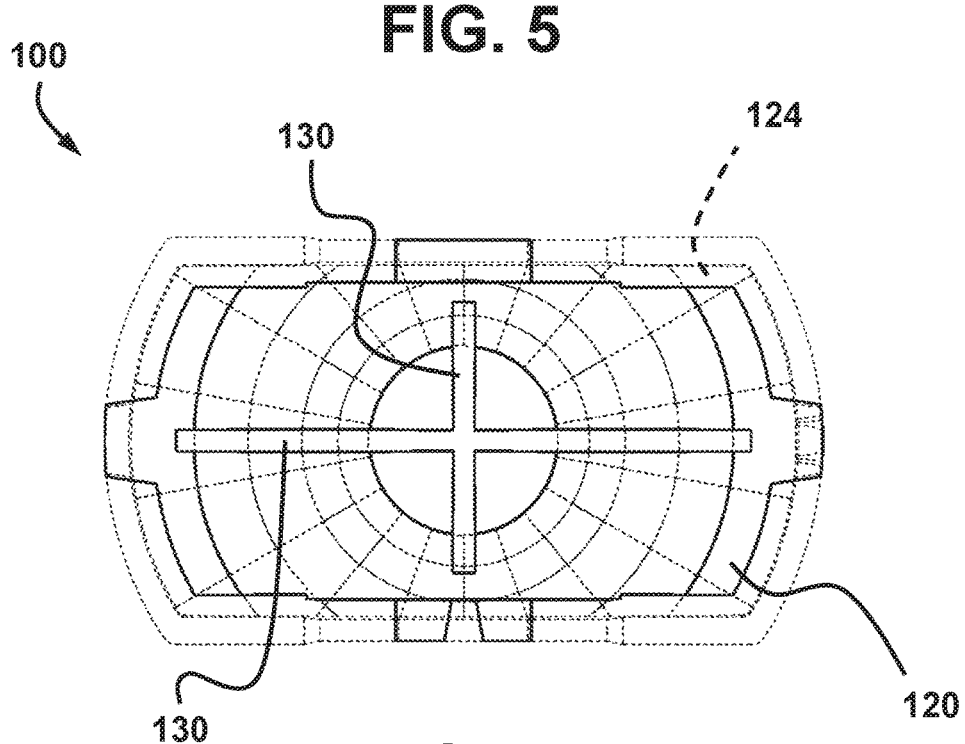
FIG. 6 is a semi-schematic front view of the lens of FIG. 1.
Figure 7:
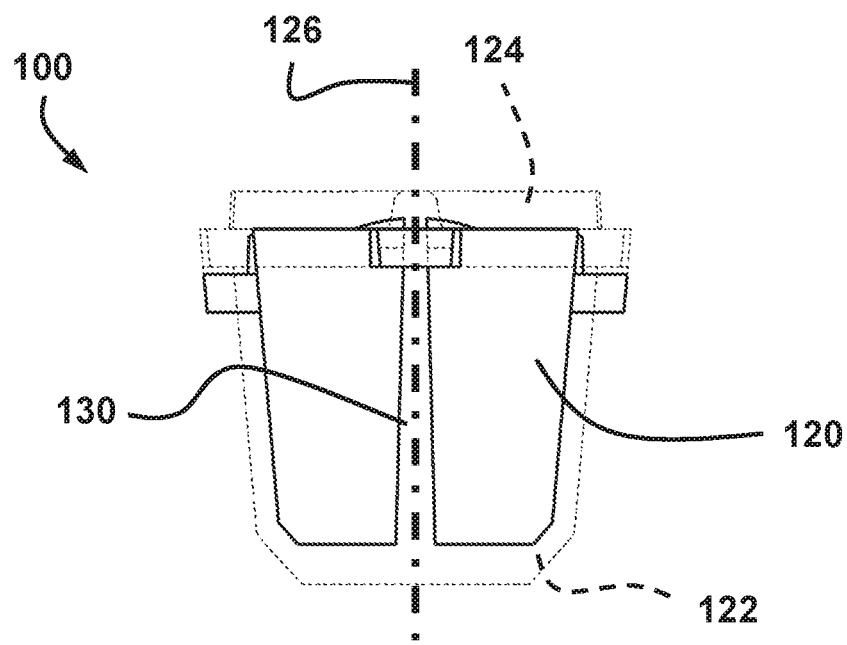
FIG. 7 is a first semi-schematic side view of the lens of FIG. 1.
Figure 8:
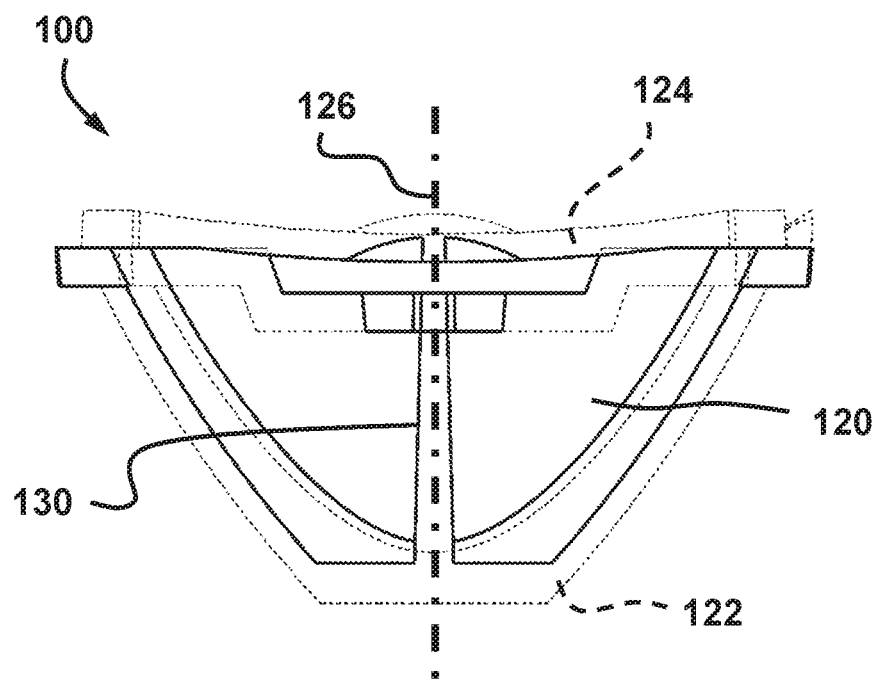
FIG. 8 is a second semi-schematic side view of the lens of FIG. 1
Figure 9:
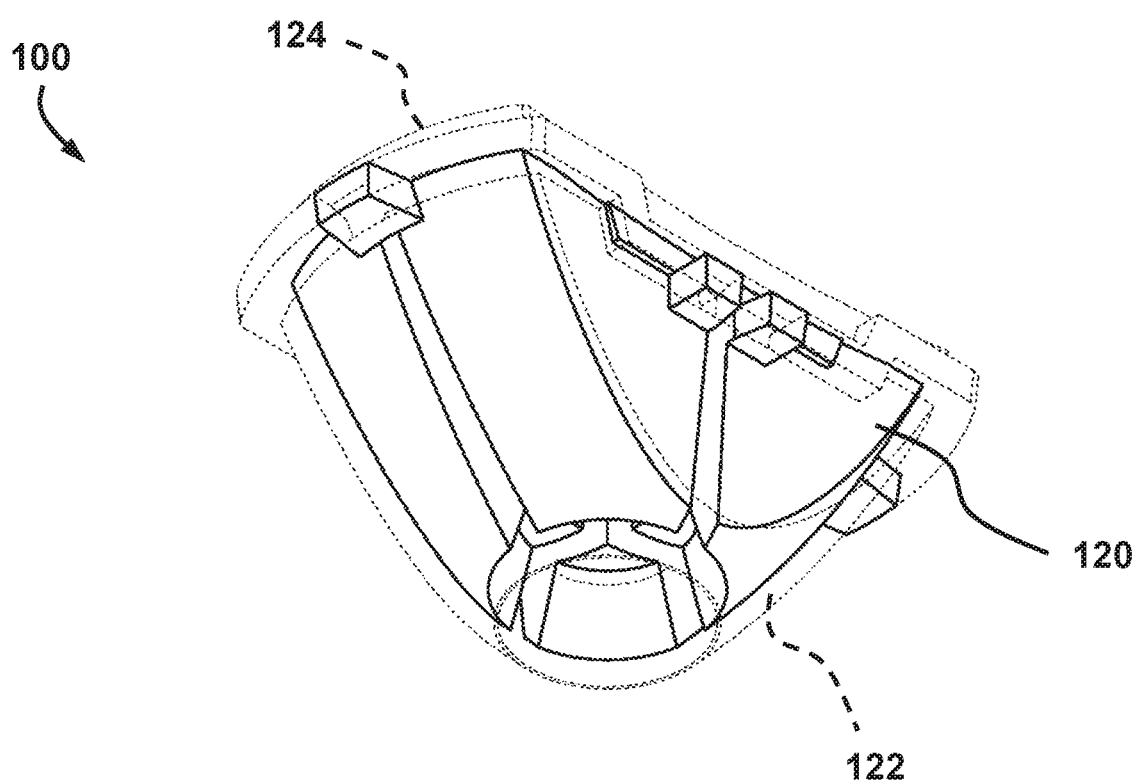
FIG. 9 is a semi-schematic isometric view of the lens of FIG. 1.

FIG. 6 is a semi-schematic front view of the lens 100. FIG. 7 is a first semi-schematic side view of the lens 100. FIG. 8 is a second semi-schematic side view of the lens 100. FIG. 9 is a semi-schematic isometric view of the lens 100. The core part 120 and the two outer lens parts 122, 124 are separately visible in FIGS. 6 to 9 only for the sake of illustration.

Figure 10:
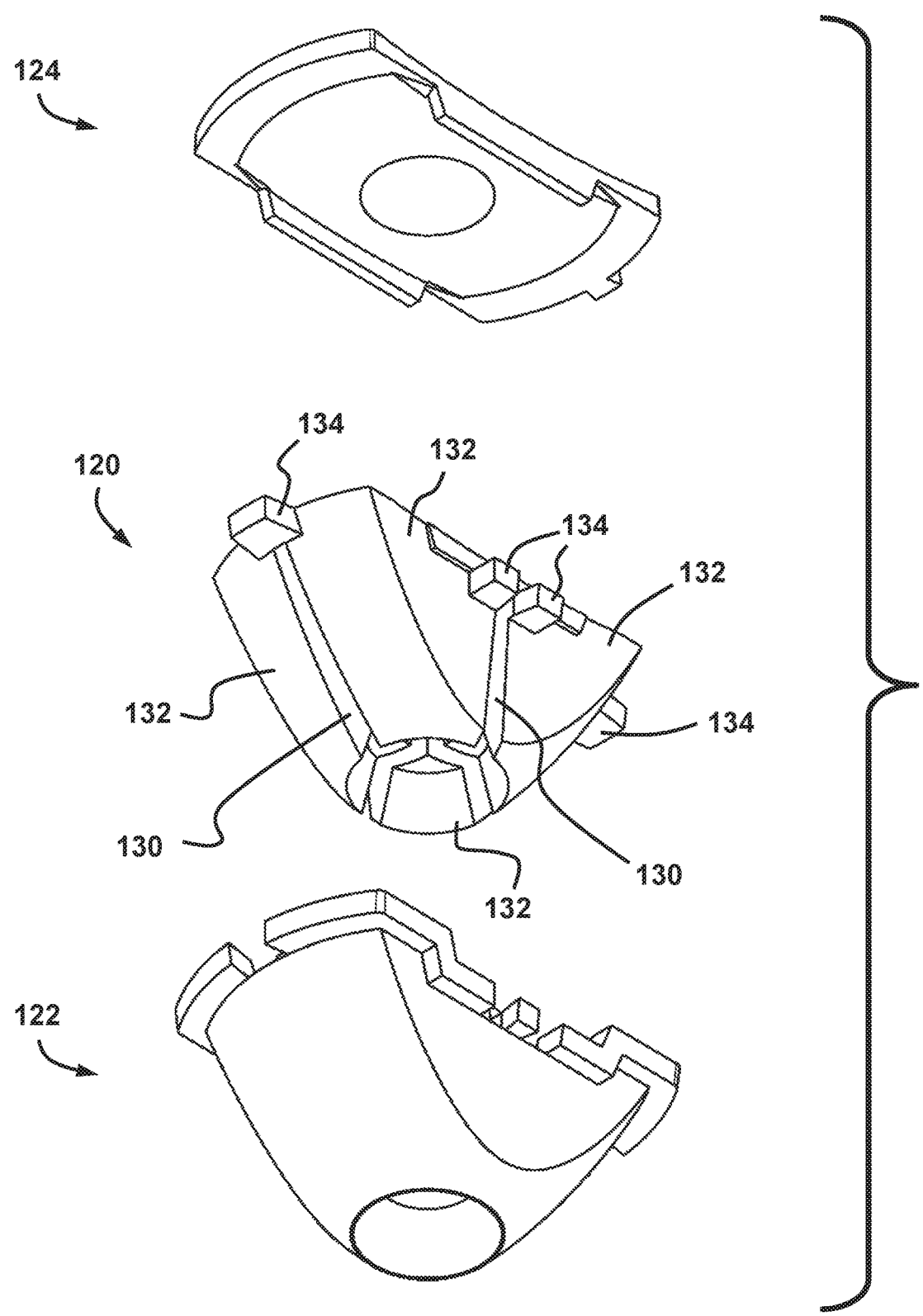
FIG. 10 is an exploded isometric view depicting the parts of the lens of FIG. 1.
Figure 11:
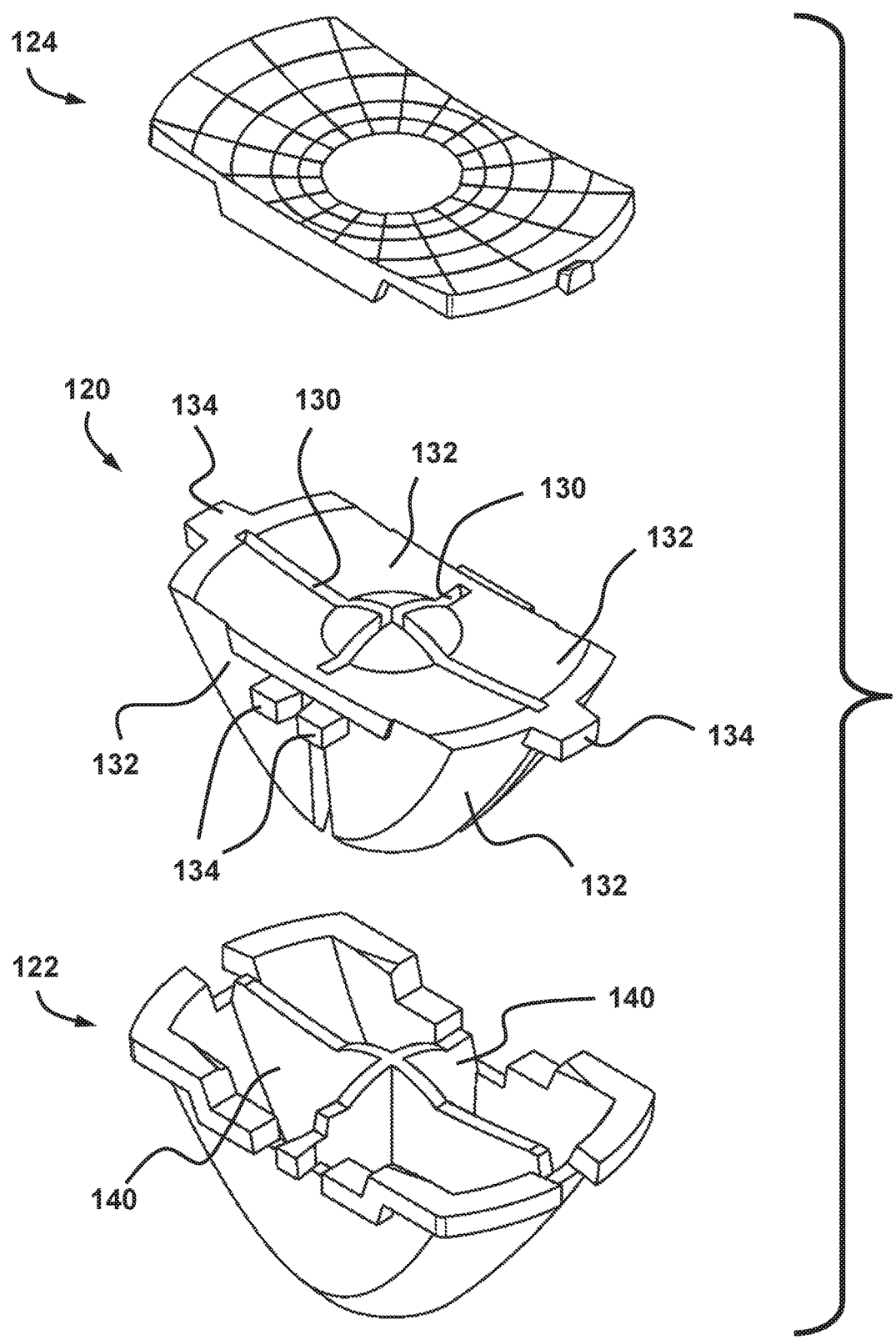
FIG. 11 is a view similar to FIG. 10 but as viewed from another angle.

FIG. 10 is an exploded isometric view depicting the parts of the lens 100 of FIG. 1. FIG. 11 is a view similar to FIG. 10 but as viewed from another angle. As can be seen, the core part 120 of the lens 100 includes two elongated slots 130 intersecting at the center. The slots 130 are perpendicular to one another and are rectilinear. They divides the core part 120 in four subparts 132, namely in four subparts 132 having a substantially similar volume. The four subparts 132 remain connected to one another by relatively small interconnecting portions. The core part 120 forms a monolithic piece over which the two outer lens parts 122, 124 are molded. The configuration is made of create smaller subparts that are easier to cool than a very thick one when the lens core 120 is manufactured. Various tabs 134 are also provided around the core part 120, for instance for positioning of the core part 120 during manufacturing.

The lens 100 can be manufactured using, for instance, an injection molding device and/or a method as described in U.S. patent application No. 61/862,366 filed on 5 Aug. 2013, the entire contents of which are hereby incorporated by reference. Using other devices and/or methods can be possible as well.

Figure 12A:
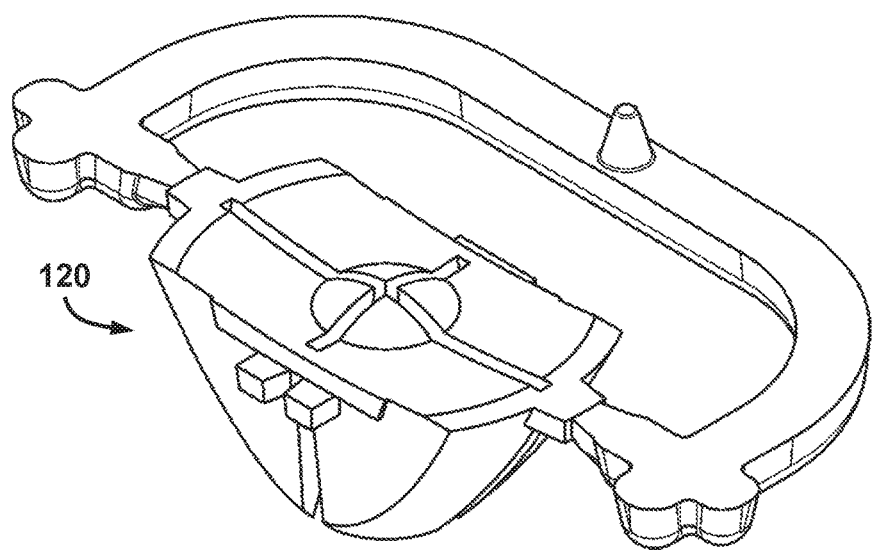
FIGS. 12A and 12B are isometric views depicting two examples of the lens core part after the first injection shot of the molten plastic material.
Figure 12B:
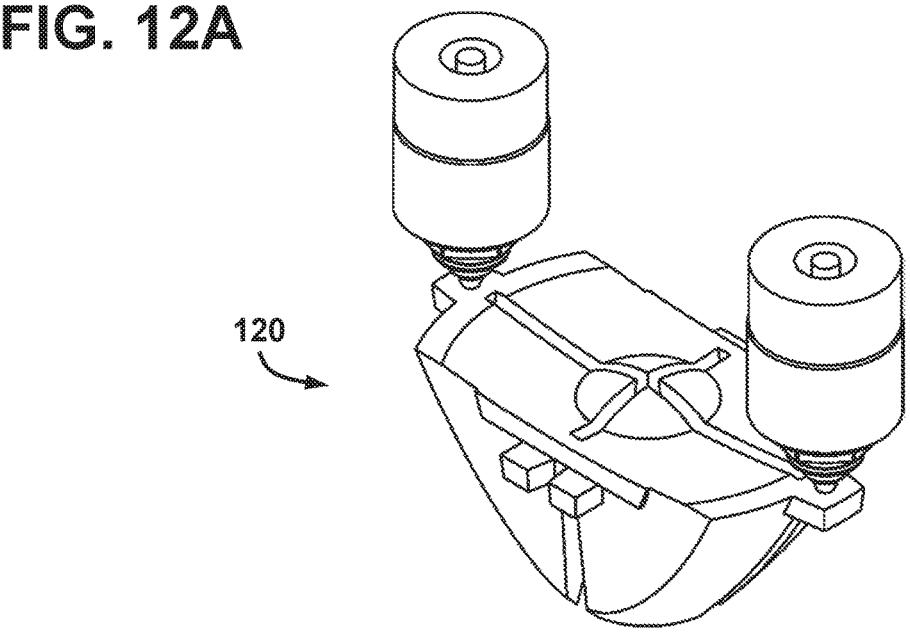

FIGS. 12A and 12B are isometric views depicting two examples of the lens core part 120 after the first injection shot of the molten plastic material. In FIG. 12A, the lens core part 120 has cold runners on the side that are made of solidified material. These portions will be cut afterwards. However, they are on non-optical surfaces. FIG. 12A shows that the molten plastic material was injected from opposite sides, both coming from a common supply.

In FIG. 12B, the lens core part 120 is shown with two hot runners. They are provided to inject the molten plastic material.

Figure 13:
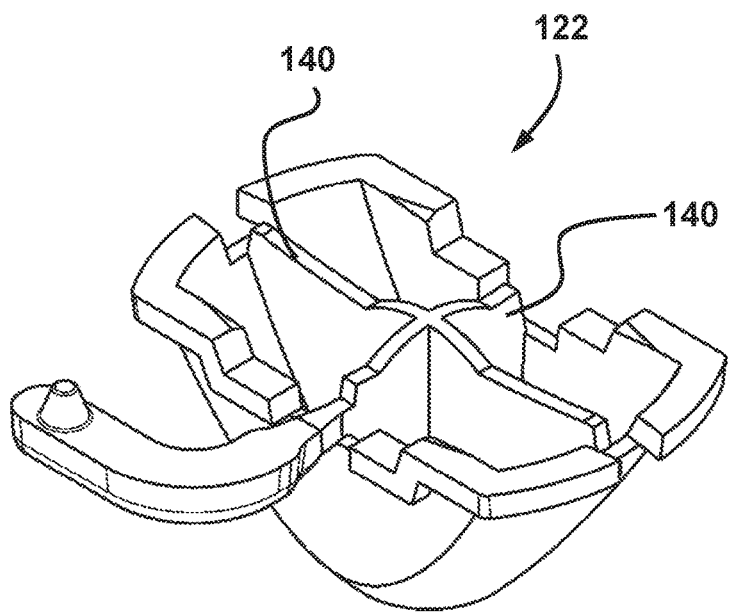
FIG. 13 is an isometric view depicting an example of the first outer lens part after the second injection shot of the molten plastic material.

FIG. 13 is an isometric view depicting an example of the first outer lens part 122 after the second injection shot of the molten plastic material. The first outer lens part 122 is shown as if it is unconnected to the lens core part 120 but again, this is only for the sake of illustration. As can be seen, the first outer lens part 122 includes internal planar ribs 140 formed by the plastic material of the first outer lens part 122 filling the corresponding elongated slots 130 inside the core part 120. The side walls of the slots 130 and these ribs 140 will be fused together during the manufacturing process. The side surfaces of the first outer lens part 122 also form the TIR surfaces that will reflect some of the light beams inside the lens 100 when they are emitted by the light source 110, as shown in FIG. 4. The first outer lens part 122 has a cold runner on one side.

Figure 14:
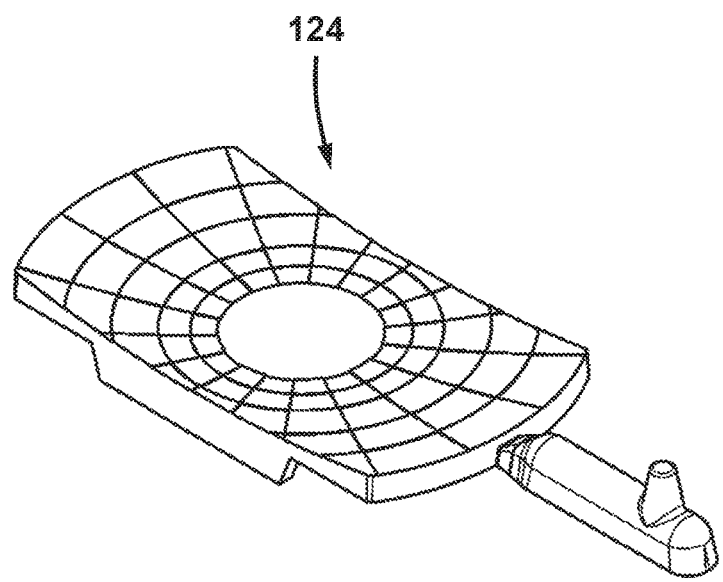
FIG. 14 is an isometric view depicting an example of the second outer lens part after the third injection shot of the molten plastic material.

FIG. 14 is an isometric view depicting an example of the second outer lens part 124 after the third injection shot of the molten plastic material. The second outer lens part 124 is shown as if it is unconnected to the lens core part 120 but again, this is only for the sake of illustration. The second outer lens part 124 has a cold runner on one side.

Figure 15:
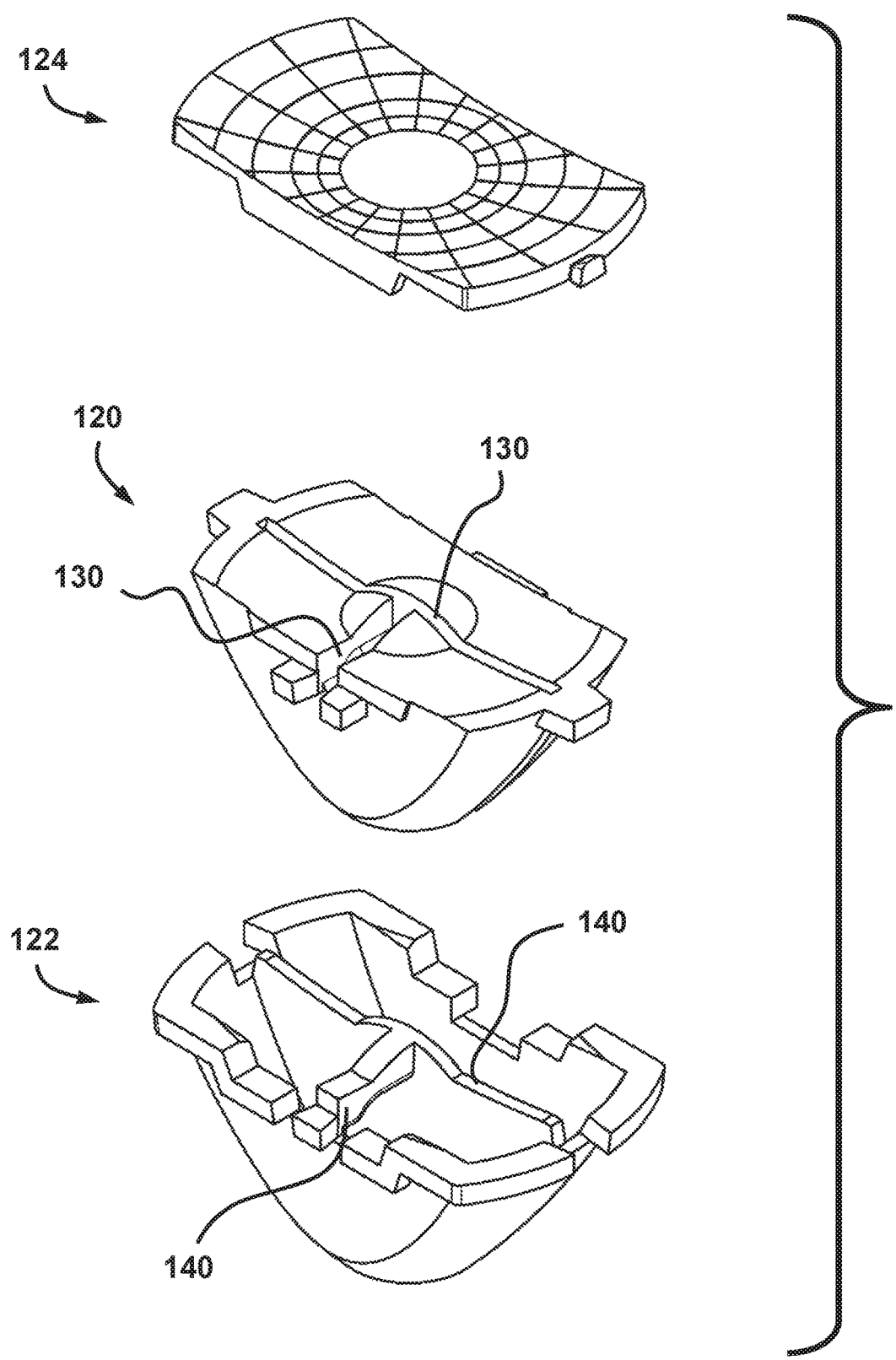
FIGS. 15 and 16 are exploded isometric views depicting lenses having other examples of lens core parts.
Figure 16:
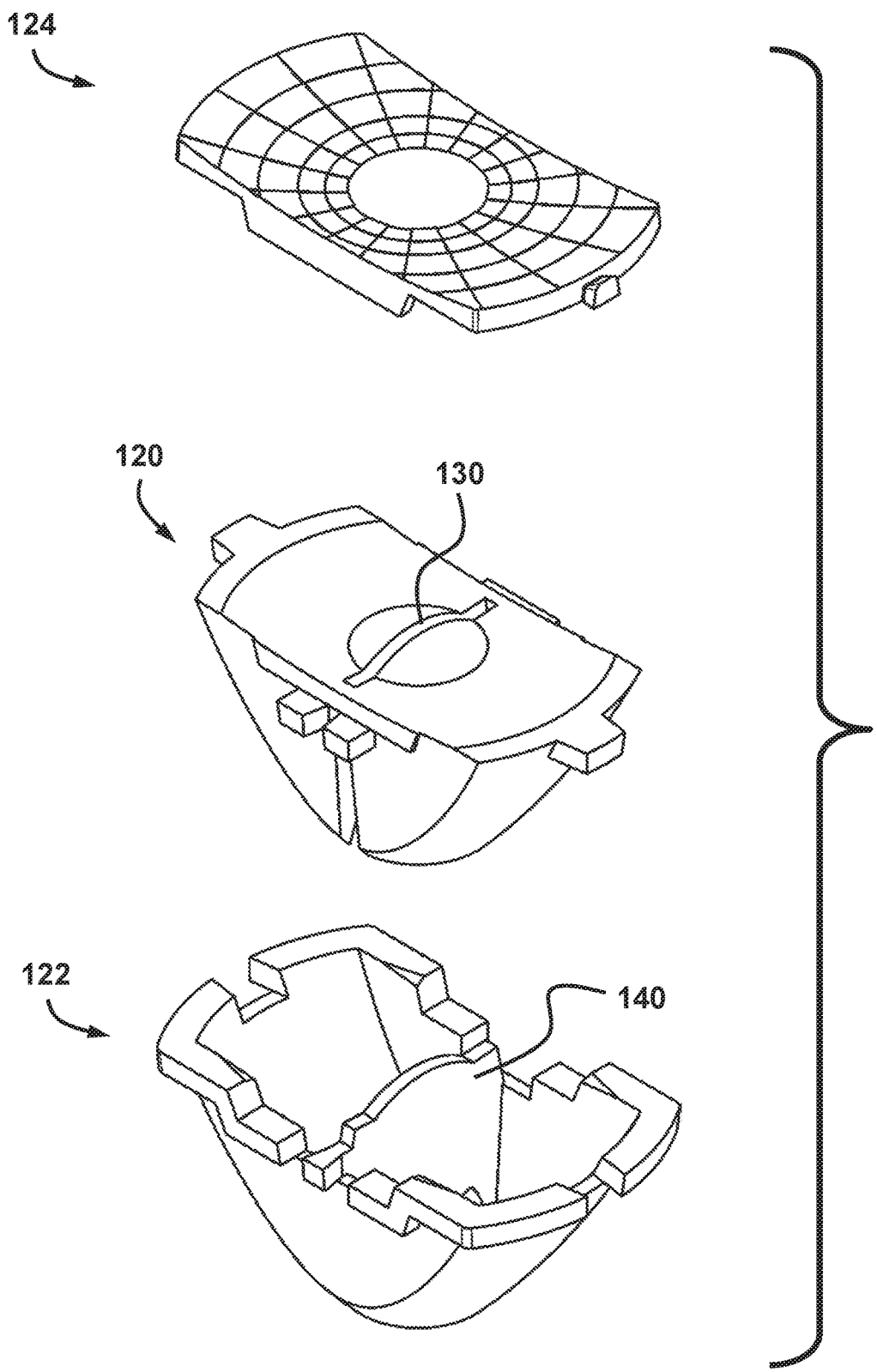

FIGS. 15 and 16 are exploded isometric views depicting lenses 100 having other examples of core parts 120. In FIG. 15, the core part 120 includes two slots 130 forming a T-shaped arrangement since one is shorter than the other. The core part 120 is thus divided in three subparts in this implementation. In FIG. 16, the core part 120 only has a single central slot 130. The core part 120 is thus divided in two subparts. Other arrangements and configurations are possible as well.

In FIGS. 5 to 16, the slots 130 are substantially parallel to the major axes of the lens 100 (width and length). Each slot 130 includes opposite planar walls that are substantially parallel to one another. Variants are possible as well.

Figure 17:
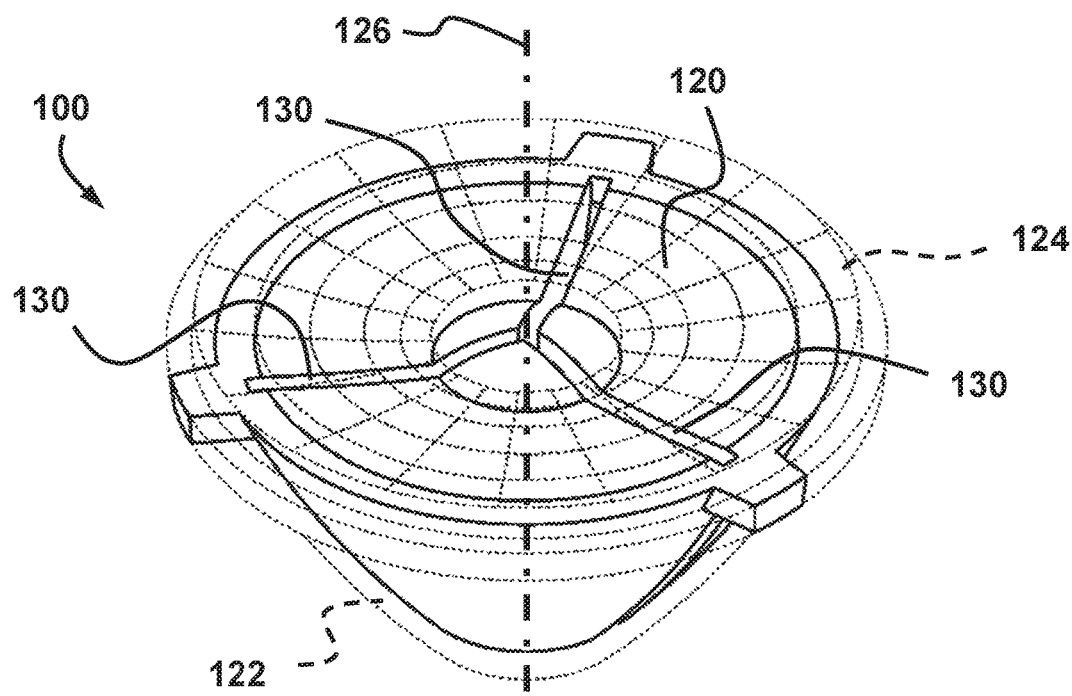
FIG. 17 is a semi-schematic isometric view illustrating another kind of lens as suggested herein.

FIG. 17 is a semi-schematic isometric view illustrating another kind of lens 100. The slots 130 of the core part 120 inside this lens 100 are disposed radially. They are also symmetrically disposed and connected together at the center where the central axis 126 is located. Like in FIG. 5, the core part and the outer lens parts 122, 124 of this lens 100 are distinctly visible only for the sake of illustration.

Figure 18:
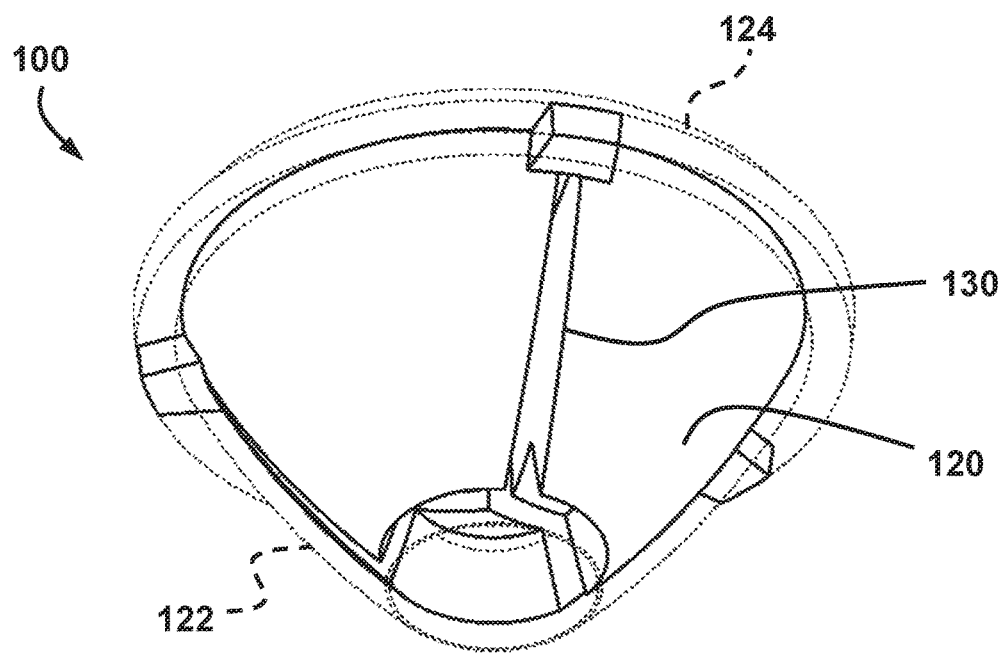
FIG. 18 is a semi-schematic isometric view of the lens of FIG. 17, as viewed from the another angle.
Figure 19:
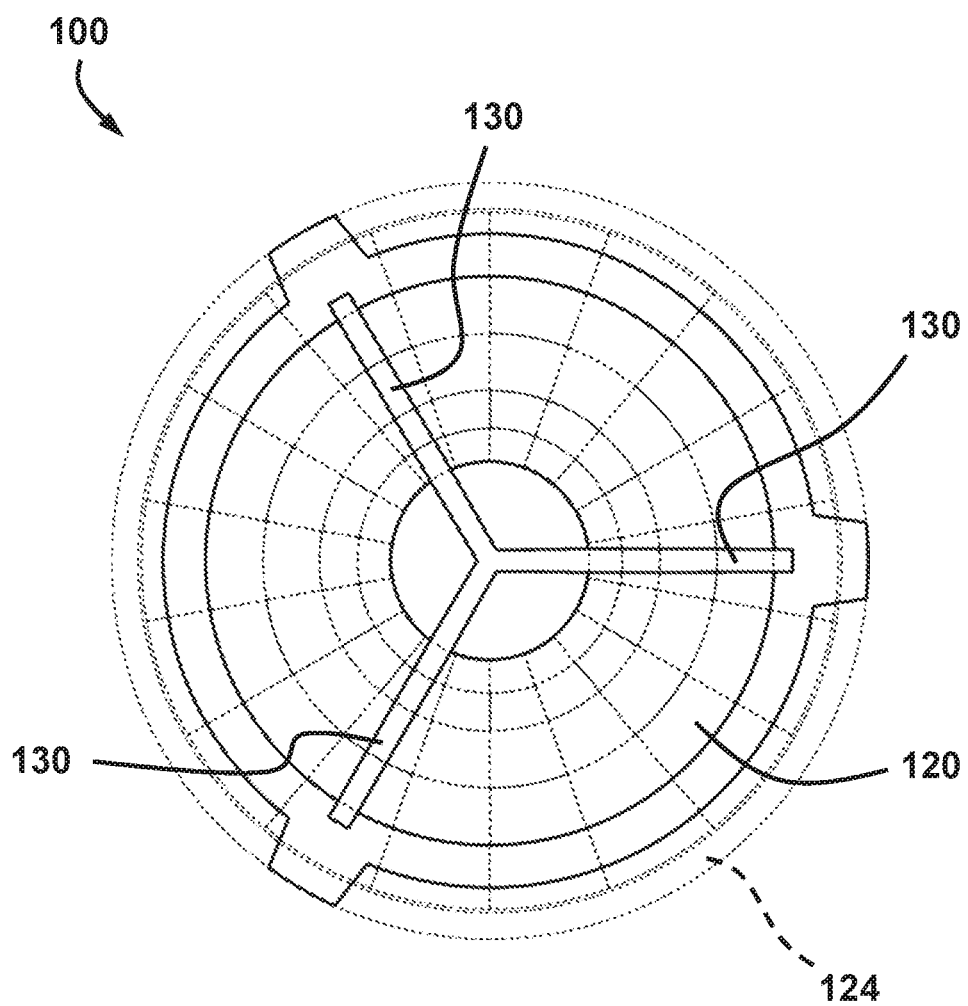
FIG. 19 is a semi-schematic top view of the lens of FIG. 17.
Figure 20:
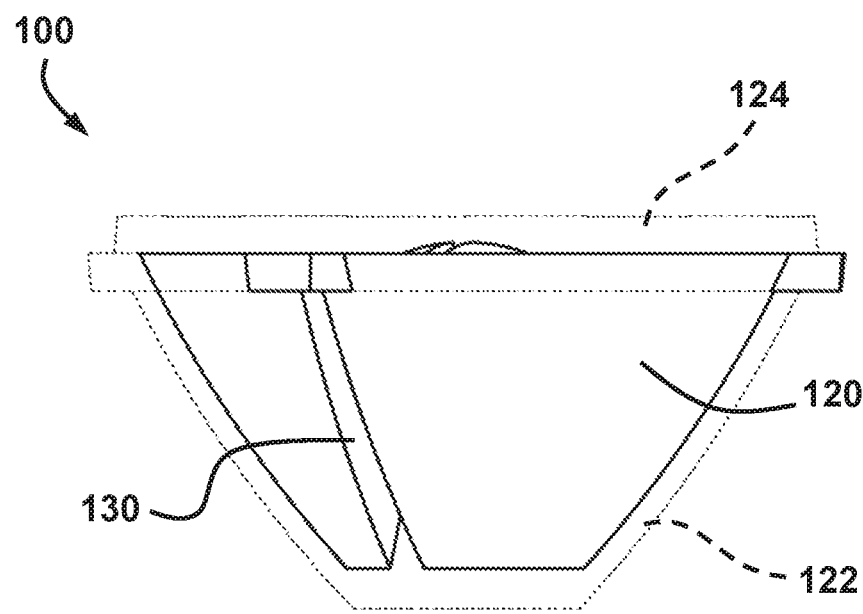
FIG. 20 is a first semi-schematic side view of the lens of FIG. 17.
Figure 21:
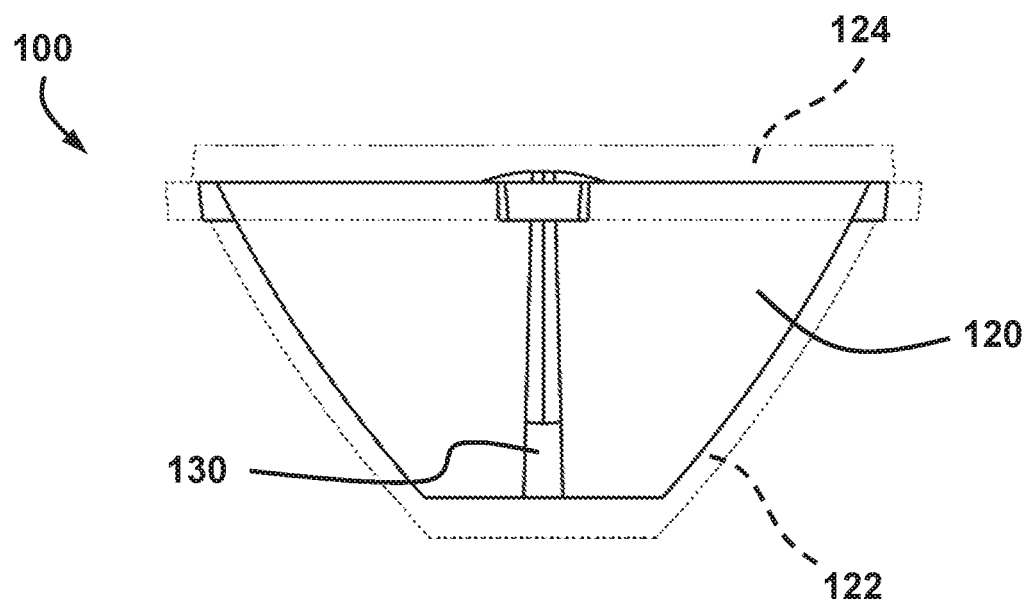
FIG. 21 is a second semi-schematic side view of the lens of FIG. 17.

FIG. 18 is an isometric semi-schematic view of the lens 100 of FIG. 17, as viewed from the bottom. FIG. 19 is a semi-schematic top view of the lens 100 of FIG. 17. FIG. 20 is a first semi-schematic side view of the lens 100 of FIG. 17. FIG. 21 is a second semi-schematic side view of the lens 100 of FIG. 17.

Figure 22:
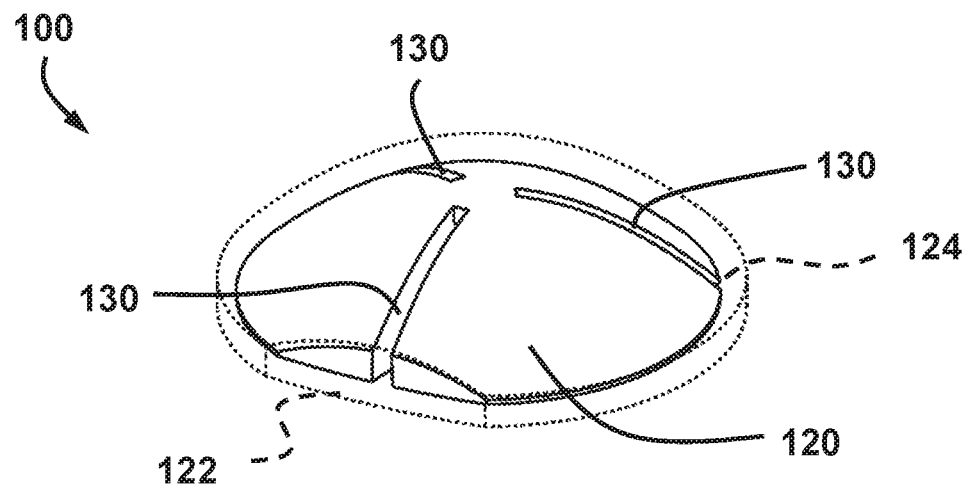
FIG. 22 is a semi-schematic isometric view illustrating another kind of lens as suggested herein.

FIG. 22 is a semi-schematic isometric view illustrating another kind of lens 100. The core part of this lens 100 includes three radially-disposed slots 130.

Figure 23:
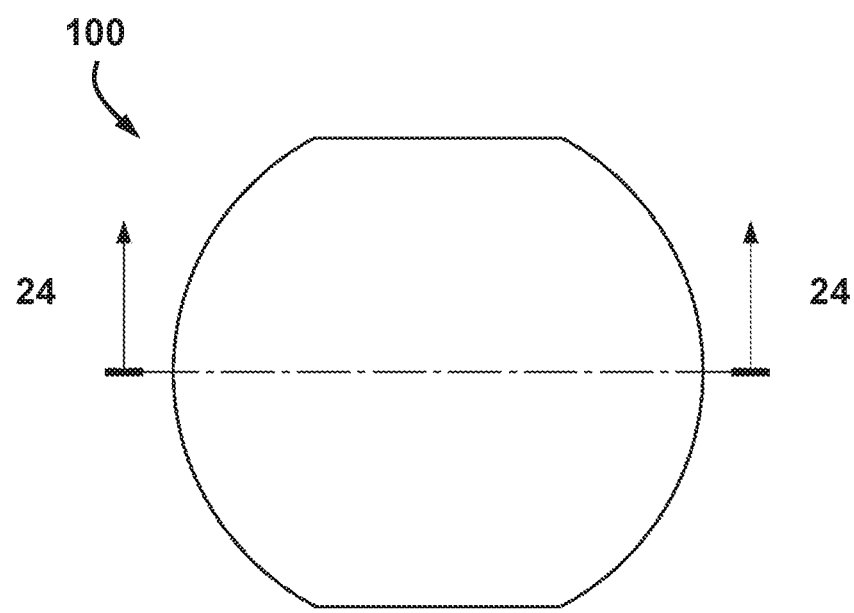
FIG. 23 is a top view of the lens of FIG. 22.
Figure 24:
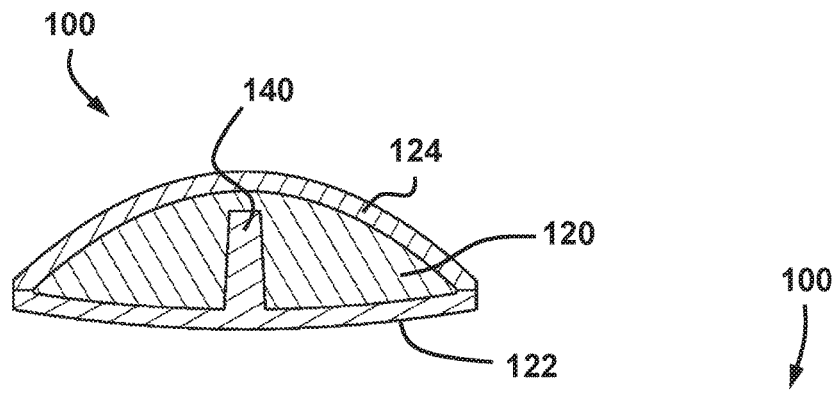
FIG. 24 is a cross-section view taken along line 24-24 in FIG. 23.
Figure 25:
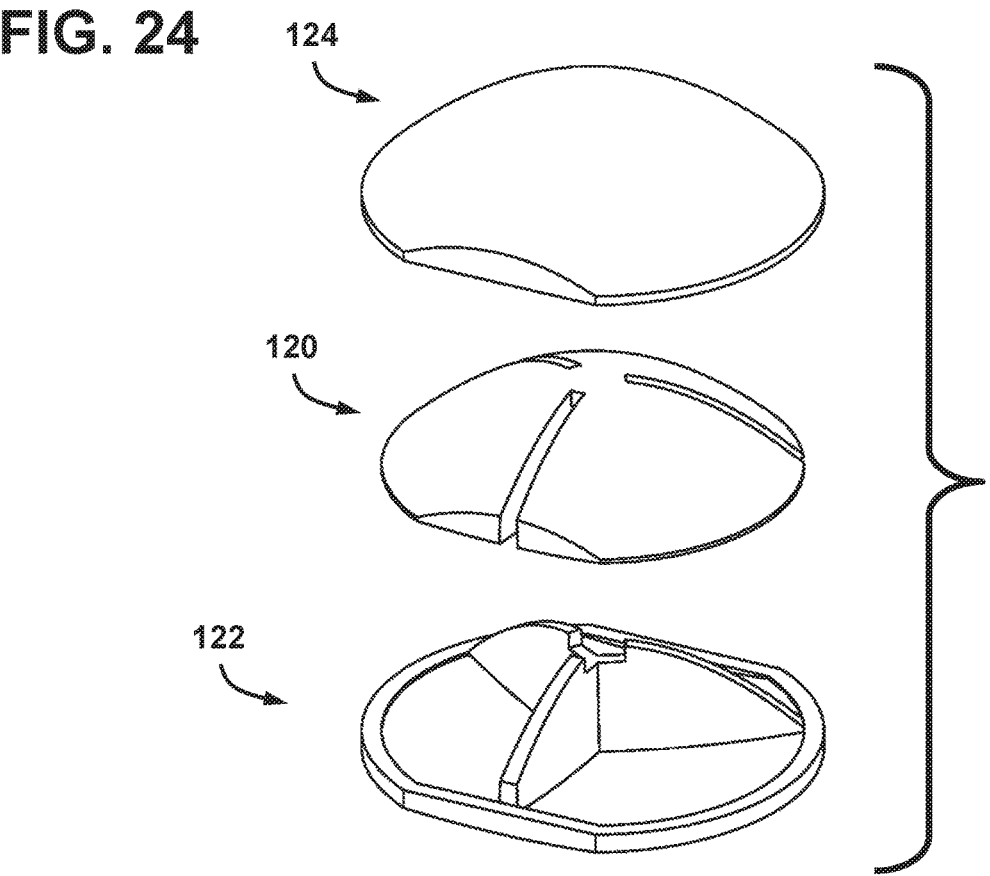
FIG. 25 is an exploded view depicting the various parts of the lens of FIG. 22.

FIG. 23 is a top view of the lens 100 of FIG. 22. FIG. 24 is a cross-section view taken along line 24-24 in FIG. 23. FIG. 25 is an exploded view depicting the various parts of the lens of FIG. 22.

The proposed concept is not limited to these examples and other implementations are possible as well.

The present detailed description and the appended figures are meant to be exemplary only, and a skilled person will recognize that variants can be made in light of a review of the present disclosure without departing from the proposed concept.

What is claimed is:

1. A thick lens for use with a light source, the lens being made by injection molding in a mold through the injection of a molten plastic material in at least three injection shots using a multistep process, the lens including:
   a first outer lens part having opposite first and second surfaces, the first surface of the first outer lens part defining a first optical active surface of the lens that refracts incoming light beams from the light source;
   a second outer lens part having opposite first and second surfaces, the first surface of the second outer lens part defining a second optical active surface of the lens that refracts the incoming light beams from the light source; and
   a lens core part forming an interior of the lens and that is embedded between the first outer lens part and the second outer lens part, the lens core part having opposite first and second surfaces, the lens core part being divided into at least two subparts separated at least partially by at least one elongated slot extending across the lens core part between the first and second surfaces of the lens core part;
   wherein the second surface of the first outer lens part and the first surface of the lens core part are fused together, the second surface of the second outer lens part and the second surface of the lens core part are fused together, and the at least one slot made through the lens core part is filled and fused with the plastic material of the first outer lens part, the lens having a lens body that is entirely filled with the plastic material in a gapless manner to prevent refraction inside the lens body of the light beams from the light source.

2. The lens as defined in claim 1, wherein the lens includes at least one total internal reflection surface to reflect some of the light beams inside the lens.

3. The lens as defined in claim 2, wherein the at least one total internal reflection surface is located on the first outer lens part.

4. The lens as defined in claim 1, wherein the subparts of the lens core part have a substantially similar volume of the moldable material.

5. The lens as defined in claim 1, wherein the lens has a central axis passing through the first and second optical active surfaces, the lens having a plane of symmetry that is coincident with the central axis.

6. The lens as defined in claim 5, wherein the at least one slot is parallel to the plane of symmetry.

7. The lens as defined in claim 5, wherein the at least one slot is perpendicular to the plane of symmetry.

8. The lens as defined in claim 1, wherein the lens core part includes more than two subparts and more than one elongated slot extending across the lens core part between the first and the second surface of the lens core part.

9. The lens (100) as defined in claim 8, wherein the slots are intersecting one another.

10. The lens as defined in claim 8, wherein at least some of the slots are intersecting one another at right angle.

11. The lens as defined in claim 10, wherein the slots are intersecting one another at a central axis passing through the first and second optical active surfaces.

12. The lens as defined in claim 8, wherein at least some of the slots are rectilinear, each rectilinear slot including opposite planar walls that are substantially parallel to one another.

13. The lens as defined in claim 8, wherein the slots are at least three in number and are radially disposed inside the lens core part.

14. The lens as defined in claim 1, wherein the at least one slot is substantially parallel to a major axis of the lens.

15. An illumination apparatus including:
 a solid state light source; and
 a thick lens through which light from the solid state light source is collected, the lens being constructed as defined in claim 1.

16. The illumination apparatus as defined in claim 15, wherein the solid state light source includes a LED.

* * * * *